United States Patent [19]

Maalouf

[11] 4,000,087

[45] Dec. 28, 1976

[54] MICROCAPSULES USEFUL IN CARBONLESS COPYING SYSTEMS AND PROCESS FOR THEIR PREPARATION

[75] Inventor: George E. Maalouf, Niagara Falls, N.Y.

[73] Assignee: Moore Business Forms, Inc., N.Y.

[22] Filed: July 29, 1974

[21] Appl. No.: 493,966

[52] U.S. Cl. .............................. 252/316; 427/151; 428/307

[51] Int. Cl.$^2$ .............................. B01J 13/02

[58] Field of Search .................... 252/316; 428/307

[56] References Cited

UNITED STATES PATENTS

| | | | |
|---|---|---|---|
| 3,016,308 | 1/1962 | Macaulay | 252/316 X |
| 3,287,154 | 11/1966 | Haas | 252/316 X |
| 3,396,117 | 8/1968 | Schuetze | 252/316 X |
| 3,429,827 | 2/1969 | Ruus | 252/316 |
| 3,806,463 | 4/1974 | Konishi et al. | 252/316 |
| 3,824,114 | 7/1974 | Vassiliades et al. | 252/316 X |

*Primary Examiner*—Richard D. Lovering
*Attorney, Agent, or Firm*—Watson, Cole, Grindle & Watson

[57] ABSTRACT

Disclosed is a process for preparing improved microcapsules which are useful in connection with carbonless copying systems. Also disclosed are the microcapsules themselves which comprise minute discrete droplets of liquid fill material including an initially colorless chemically reactive color forming dye precursor and a carrier therefor encapsulated within individual, rupturable, generally continuous polyamide shells formed thereabout. The process comprises the steps of incorporating in the fill material, an amount of an epoxy resin or a polystyrene resin effective to render the microcapsules resistant to inadvertent release and transfer of the fill material.

32 Claims, No Drawings

MICROCAPSULES USEFUL IN CARBONLESS COPYING SYSTEMS AND PROCESS FOR THEIR PREPARATION

BACKGROUND OF THE INVENTION

1. Field Of The Invention

The present invention relates to carbonless copying systems and in particular to microcapsules which are useful in connection with such systems and which comprise minute discrete droplets of liquid fill material including an initially colorless chemically reactive color forming dye precursor and a carrier therefor encapsulated within individual, rupturable, generally continuous shells.

2. Description Of The Prior Art

Impact or pressure sensitive carbonless transfer papers have recently come into wide usage in the U.S. and throughout the world. Ordinarily, such papers are printed and collated into manifolded sets capable of producing multiple copies. In this connection, pressure applied to the top sheet causes a corresponding mark on each of the other sheets of the set.

The top sheet of paper, upon which the impact or pressure is immediately applied, ordinarily has its back surface coated with microscopic capsules containing one of the reactive ingredients which interreact to produce a mark. A receiver sheet, placed in contact with such back face of the top sheet has its front surface coated with a material having a component which is reactive with the contents of the capsule so that when capsules are ruptured upon impact by stylus or machine key, the initially colorless or substantially colorless contents of the ruptured capsules react with a coreactant therefor on the receiver sheet and a mark forms on the latter corresponding to the mark impressed by the stylus or machine key.

In the art, impact transfer papers are designated by the terms CB, CFB and CF, which stand respectively for "coated back", "coated front and back", and "coated front". Thus, the CB sheet is usually the top sheet and the one on which the impact impression is directly made; the CFB sheets are the intermediate sheets, each of which have a mark formed on the front surface thereof and each of which also transmits the contents of the ruptured capsules from its back surface to the front surface of the next succeeding sheet; and the CF sheet is the last sheet and is only coated on its front surface to have an image formed thereon. The CF sheet is not normally coated on its back surface as no further transfer is desired.

While it is customary to coat the capsules on the back surface and to coat the co-reactant for the capsule contents on the front surface of each sheet, this procedure could be reversed if desired. Further, with some systems, coatings need not be used at all and the co-reactive ingredients may be carried in the sheets themselves, or one may be carried in one of the sheets and the other may be carried as a surface coating. Further, the co-reactive materials may each be microencapsulated. Patents illustrative of many of the various kinds of systems which may incorporate such co-reactive ingredients and which may be used in the production of manifolded transfer papers include, for example, U.S. Pat. No. 2,299,694 to Green, U.S. Pat. No. 2,712,507 to Green, U.S. Pat. No. 3,016,308 to Macaulay, U.S. Pat. No. 3,429,827 to Ruus and U.S. Pat. No. 3,720,534 to Macaulay et al.

The most common variety of carbonless impact transfer paper, and the type with which the present invention is utilized, is the type illustrated, for example, in Green U.S. Pat. No. 2,712,507 and Macaulay U.S. Pat. No. 3,016,308 wherein microscopic capsules containing a liquid fill comprising a solution of an initially colorless chemically reactive color forming dye precursor are coated on the back surface of the sheet, and a dry coating of a coreactant chemical for the dye precursor is coated on the front surface of a receiving sheet.

Many color precursors useful in connection with carbonless copying systems are known to those skilled in the art to which the present invention pertains. For example, specific reference is made to the color precursors mentioned in the patent to Phillips, Jr. et al, U.S. Pat. No. 3,455,721 and particularly to those listed in the paragraph bridging columns 5 and 6 thereof. These materials are capable of reacting with a CF coating containing an acidic material such as an acid-leached bentonite-type clay or the acid-reactant organic polymeric material disclosed in the Phillips, Jr. et al U.S. Pat. No. 3,455,721 patent. Many of the color precursors disclosed in the U.S. Pat. No. 3,455,721 patent referred to above are capable of undergoing an acid-base type reaction with an acidic material. Other previously known color precursors are the spiro-dipyran compounds disclosed in the patent to Harbort, U.S. Pat. No. 3,293,060 with specific reference being made to the disclosure of the U.S. Pat. No. 3,293,060 patent extending from column 11, line 32 through column 12, line 21. The color precursors of Harbort, as well as the color precursors of Phillips, Jr. et al are initially colorless and are capable of becoming highly colored when brought into contact with an acidic layer such as an acid-leached bentonite-type clay or an acid-reacting polymeric material, or the like.

Generally speaking, color precursor materials of the type disclosed by Phillips, Jr. et al U.S. Pat. No. 3,455,721 and by Harbort U.S. Pat. No. 3,293,060 are dissolved in a solvent and the solution is encapsulated in accordance with the procedures and processes described and disclosed in U.S. Pat. No. 3,061,308 to Macaulay, U.S. Pat. No. 2,712,507 to Green, U.S. Pat. No. 3,429,827 to Ruus and U.S. Pat. No. 3,578,605 to Baxter. In this connection, it should be mentioned that the present invention is particularly useful in connection with microcapsules of the type disclosed by Ruus U.S. Pat. No. 3,429,827 which are produced by an interfacial polycondensation procedure.

Solvents known to be useful in connection with dissolving color precursors include chlorinated biphenyls, vegetable oils (castor oil, coconut oil, cotton seed oil, etc.), esters (dibutyl adipate dibutl phthalate, butyl benzyl adipate, benzyl octyl adipate, tricresyl phosphate, trioctyl phosphate, etc.), petroleum derivatives (petroleum spirits, kerosene, mineral oils, etc.), aromatic solvents (benzene, toluene, etc.), silicone oils, or combinations of the foregoing. Particularly useful are the alkylated naphthalene solvents disclosed in U.S. Pat. No. 3,806,463 to Konishi et al.

In the color forming systems outlined above, as will be appreciated by those skilled in the art, the color precursors are conventionally contained in pressure rupturable microcapsules which are included in the back coatings of the sheets of carbonless copying manifolded sets. Further, it will be appreciated that the acidic coatings are generally utilized as front coatings with the color precursor material in a solvent therefor being transferred from an adjacent back coating to the acidic layer front coating upon rupture of the capsules which contain the color precursor material.

Although microcapsules have been extensively used in connection with carbonless copying systems in the past, one particular shortcoming, which has continued to detract from such systems, both from an economical and from an operational point of view, is the inadvertent or unintentional development of color on the CF coatings. Free colorless dye precursor has often been present in CB coatings in the past due to limitations of the encapsulation procedure, or due to accidental capsule rupture which often occurs during handling, coating processes, printing processes, etc. This free precursor often causes discoloration by contacting the CF ingredients through the base paper in the CFB sheets and from sheet to sheet in a manifolded set or form. This discoloration, which is sometimes referred to as blush, offset, bluing, etc., is highly objectionable and undesirable in a copying or imaging system.

High surface area fillers such as Syloids (synthetic silicas) have been utilized in admixture with the microcapsules in CB coatings to prevent blush with some success. These fillers absorb free dyes or solvents or both and substantially reduce the quantity of dye material which is free to be transferred to an adjacent CF coating. However, the inclusion of such additives in CB coatings increases the cost of the latter and often such additives operate to reduce image intensity. The foregoing concepts as well as other prior art procedures directed to alleviating the problem of inadvertent CF discoloration in carbonless copying systems are disclosed in U.S. Pat. No. 3,617,334 to Brockett et al; U.S. Pat. No. 3,481,759 to Ostlie; and U.S. 3,625,736 to Matsukawa et al. Also note British Pat. Nos. 1,232,347 and 1,252,858 which disclose the intermixture of finely divided particles of starch or starch derivatives with microcapsules for the purpose of reducing stain-formation during the processing of pressure sensitive recording paper. British Pat. No. 1,252,858 also discloses the use of hard, inert beads (such as fine glass beads) and short cellulose fibers or floc as a stilt material to guard against unintended capsule rupture and the consequent development of coloration and smudging from frictional pressures encountered in the handling and use of carbonless copying papers.

SUMMARY OF THE INVENTION

In accordance with the concepts and principles of the present invention, unintended CF discoloration is substantially avoided in colorless copying systems utilizing CB coatings comprising microencapsulated dye precursor solutions through the use of an additive which is included in the encapsulated liquid fill material. More specifically, the present invention provides improved microcapsules which are useful in connection with carbonless copying systems and which comprise minute discrete droplets of liquid fill material including an initially colorless chemically reactive color forming dye precursor and a carrier therefor encapsulated within individual, rupturable, generally continuous polyamide shells. These microcapsules are produced by a process which comprises the step of incorporating in the fill material, an amount of an epoxy or polystyrene resin effective to render the microcapsules resistant to inadvertent release and transfer of the fill material. More specifically, the process is utilized in connection with polyamide shells which are formed by interfacial polycondensation and even more particularly, in the highly preferred form of the invention, the shells are formed from a polyterephthalamide and the resin which is added to the fill is an epichlorohydrin/bisphenol A epoxy resin. The present invention has been found to be particularly useful in conjunction with microcapsules which contain a dye precursor such as Michler's hydrol, p-toluene sulfinate of Michler's hydrol, methyl ether of Michler's hydrol, benzyl ether of Michler's hydrol and the morpholine derivative of Michler's hydrol.

In another aspect, the present invention provides microcapsules which are useful in connection with carbonless copying systems. The microcapsules comprise minute, discrete droplets of liquid fill material including an initially colorless chemically reactive color forming dye precursor and a carrier therefor. Each of the droplets is individually encapsulated in a rupturable, generally continuous polyamide shell and an epoxy or polystyrene resin is incorporated in the fill material in an amount effective to render the microcapsules resistant to inadvertent release and transfer of the fill material.

DETAILED DESCRIPTION OF THE INVENTION

In carbonless copying systems, premature discoloration or color development on the CF is objectionable. Discoloration can occur during coating, processing and handling of the carbonless paper. It can also occur in forms prepared from carbonless paper and in rolls of carbonless paper under ordinary conditions of storage and ageing, or it can occur as the result of a combination of one or more of the foregoing conditions. Premature discoloration is usually due to the contact and reaction between free (unencapsulated) precursor or its decomposition products in the CB coating and the record-developing material in the CF coating. This could be a direct physical contact, an indirect contact brought about by the presence of a low vapor pressure precursor or both. Free precursor generally results because a small amount of precursor initially escapes encapsulation, because capsules leak, or because capsules are ruptured during coating, processing or handling operations.

In accordance with the present invention, objectionable premature discoloration or color development on CF coatings is substantially eliminated by incorporating in the microencapsulated fill material, an amount of an epoxy or polystyrene resin which is effective to render the microcapsules resistant to inadvertent release and transfer of the fill material. The concepts and principles of the invention have utility with all types of microcapsules having a polymeric shell and the invention is particularly useful in connection with microcapsules having a polyamide shell. In its preferred form the invention is utilized in connection with polyamide shells which have been formed by an interfacial polycondensation reaction in accordance with the procedures disclosed in the patent to Ruus, U.S. Pat. No. 3,429,827.

The present invention contemplates the incorporation of either an epoxy resin or a polystyrene resin in the intended fill material prior to the formation of microcapsules. The preferred polystyrene resin is Styron 666U, a commercial product of the Dow Chemical Company. Styron 666U is a general purpose polystyrene having a Vicat softening point of 212° F (ASTM method D1525) and an Izod impact strength of 0.2 ft lbf/in of notch at 73° F (ASTM method D256). This material also has a specific gravity of 1.04 (ASTM method D792) and a melt viscosity of 1800 poises (ASTM method Rate B D1703). The preferred epoxy resin is Epon 1002, a commercial product of Shell Chemical Company. Epon resin 1002 is an epichlorohydrin/bisphenol A-type solid epoxy resin having the following typical molecular structure:

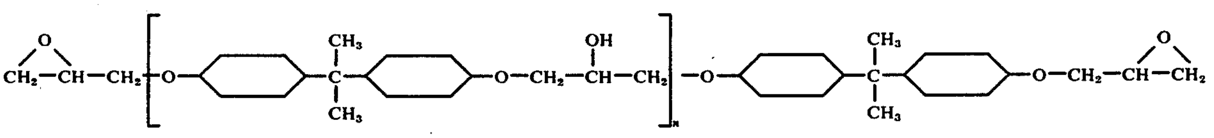

Epon 1002 has a viscosity of 1.7 to 3.0 poises when measured at 25° C by the Bubble-Tube method (ASTM D154). Moreover, Epon resin 1002 has an epoxide equivalent of about 600 to about 700 (ASTM D1652-59T). Another highly preferred epoxy resin is Epon resin 1001 which has a viscosity of 1.0 to 1.7 poises and an epoxide equivalent of 450 to 550. More generally, epoxy resins having an epoxide equivalent within the range of from about 350 to 2500 should perform reasonably well for the purposes of the present invention. The amount of resin to be incorporated in the microcapsules ranges from 1 to 10% based on the dry weight of the capsules with a particularly preferred amount being approximately 5%. The amount of resin incorporated in the fill material should also be within the range of from about 1.3 to about 13.3% by weight based on the total weight of the solvent which forms the bulk of the fill material. In this latter connection, the particularly preferred quantity of resin is about 6.7 weight percent based on the total weight of the solvent.

EXAMPLE 1

In this Example, prior art microcapsules having a fill material which does not contain a polystyrene or epoxy resin were produced for comparison purposes. 1.00 grams of p-toluene sulfinate of Michler's hydrol (PTSMH) were admixed with 20.0 grams of dibutyl phthalate (DBP) solvent and this admixture was warmed slightly on a hot plate until a clear solution (solution A) was obtained. Thereafter solution A was allowed to cool to room temperature. Then, 3.26 grams of terephthaloyl chloride were added to 10.0 grams of DBP solvent and this mixture was also warmed slightly on a hot plate until a clear solution (solution B) was obtained. Solution B was then also allowed to cool to room temperature. After solutions A and B were prepared, 100 ml of an aqueous solution containing 2.0 weight percent Elvanol 50-42 (a commercial product of E. I. duPont De Nemours & Co. which is a polyvinyl alcohol having a hydrolysis of 87 to 89 percent and a viscosity of 35 to 45 cps. in a 4% aqueous solution at 20° C as determined by the Hoeppler falling ball method) were placed in a semi-micro Waring blender and then solutions A and B were mixed together at room temperature and the resultant solution was added to the Elvanol solution in the blender. The blender was activated and high shear agitation was continued for about 2 minutes until an emulsion having a dispersed phase particle size of about 5 to 6 microns was obtained. In this emulsion, the continuous phase was the aqueous solution containing the Elvanol polyvinyl alcohol and the dispersed phase was the DBP solution of PTSMH and terephthaloyl chloride. The emulsion was then transferred to a suitable container, such as a beaker, and was stirred with a variable speed mechanical stirrer at 300 to 500 rpm while an aqueous solution containing 1.86 gms of diethylene triamine, 0.96 gms of sodium carbonate and 20 ml of water was added. Stirring was continued at room temperature for about 24 hours until a stable pH was observed. By this time, the particles of dispersed phase had become individually encapsulated in a polyamide shell. The slurry containing the microcapsules and having the Elvanol polyvinyl alcohol binder in the continuous phase was then drawn down on a 13 pound neutral base continuous bond paper sheet at a coating weight of approximately 2.34 to 3.04 gms per square meter and the coated sheet was oven dried at a temperature of 110° C for about 30 to 45 seconds.

EXAMPLE 2

In this Example, the procedure was identical with that set forth in Example 1 except that in this instance, 1.0 gm of Epon 1002 was incorporated in solution A and the preparation of solution A was varied slightly in that the Epon 1002 and the dibutyl phthalate were first mixed and the admixture was warmed slightly on a hot plate until a clear solution was obtained. This solution was allowed to cool to room temperature before the PTSMH was added. The PTSMH was then added at room temperature and the admixture was again warmed slightly on a hot plate until a clear solution was obtained. Solution A containing Epon 1002, PTSMH and DBP was then allowed to cool to room temperature. The capsules thus produced which include a fill material containing Epon 1002 were coated onto a paper substrate in accordance with the procedure outlined in Example 1.

EXAMPLE 3

In this Example, the exact procedure outlined in Example 2 was repeated except that in this instance the quantity of Epon 1002 included in solution A is 2.0 gms. The microcapsules thus produced were coated onto a paper substrate in accordance with the procedure outlined in Example 1.

EXAMPLE 4

In this Example, the procedure outlined in Example 2 was repeated identically except that in this instance 1.0 gm of Styron 666U was utilized in solution A rather than the Epon 1002. In all other respects the procedure was the same and the resultant microcapsules were coated onto a paper substrate in accordance with the procedure outlined in Example 1.

EXAMPLE 5

In this Example, coated paper was produced by a procedure identical with that set forth in Example 4 except that in this instance solution A contained 2.0 gms of Styron 666U.

The CB papers produced in accordance with Examples 2 through 5 above were compared with the CB paper produced in accordance with Example 1. The papers were evaluated and compared (1) with regard to the intensity of the image produced in an eight-part manifolded set when the latter is subjected to normal usage, (2) with regard to ghosting and (3) with regard to blush. In each instance where CF sheets are utilized or referred to in the following evaluation and comparison procedures it should be understood that the acidic coatings thereon consist of acid-leached bentonite-type clay layers as are fully disclosed in presently pending application of Baxter, Ser. No. 125,075, filed Mar. 17, 1971 and now abandoned, the entirety of which is hereby specifically incorporated by reference.

Ghosting is defined as a secondary image transfer from a CB sheet to a CF sheet. The primary image is the original image produced on a CF sheet as a result of an imaging process such as typing, printing, etc. Secondary image transfer occurs subsequently to the original image producing operation. To measure the secondary image transfer (or ghosting), a fresh CF sheet is mated with the CB sheet in place of the original imaged CF sheet and the secondary image thus produced is examined visually at different periods. Ghosting could occur during ordinary handling of carbonless paper and is objectionable in carbonless copying systems.

Blush is an unintentional coloration on a CF coating caused by contact with free precursor from a CB coating. Blush can result from the presence of a small amount of dye precursor which initially escaped encapsulation, from leaky capsules or from capsules which are ruptured during processing or handling of the carbonless paper.

As a direct result of the foregoing evaluations and comparisons, it was determined that the papers produced in accordance with Examples 2, 3 and 4 were capable of generating an image having an intensity comparable with the intensity of the image generated by the paper produced in accordance with Example 1 while the image generated by the paper produced in accordance with Example 5 had slightly less intensity than the intensity of the image from the paper of Example 1 although the intensity of the image from the paper of Example 5 was acceptable. With regard to blush, the samples were evaluated five days after production, nine days after production and nineteen days after production. The papers produced in accordance with Examples 2 through 5 clearly exhibited less blush than the papers produced in accordance with Example 1 at all stages of the blush evaluation and comparison tests. With regard to ghosting, the papers were tested for ghosting after 5 days and after 20 days. At the end of 5 days, none of the papers produced in accordance with Examples 1 through 5 exhibited a significant tendency to ghost. After 20 days, however, each of the papers tested showed some ghosting, although in no instance was the ghosting experienced with the papers produced in accordance with Examples 2 through 5 greater than the ghosting which was experienced with the paper produced in accordance with Example 1 and in fact the paper produced in accordance with Example 2 (low concentration Epon) showed less ghosting than the paper of Example 1. Since blush was substantially reduced and image intensity was not significantly diminished, it was concluded that the paper produced in accordance with Examples 2 through 5 was superior to the paper produced in accordance with Example 1.

EXAMPLE 6

In this Example, the formulations set forth in Examples 1 (without resin) and 3 (with resin) were utilized except that sodium carbonate and sodium hydroxide were used as bases and the amounts were varied to provide acidic, neutral and alkaline pH levels. In the formulations of the present Example, 0.87 gms of sodium carbonate were utilized to provide an acidic pH of approximately 6.0, 0.96 gms of sodium carbonate were utilized to provide a neutral pH of approximately 7.0 and 1.44 gms of sodium carbonate were utilized to provide an alkaline pH of approximately 8.0. In a similar manner, 0.68 gms of sodium hydroxide were utilized to provide an acidic pH of approximately 6.0, 0.77 gms of sodium hydroxide were utilized to provide a neutral pH of approximately 7.0 while 0.96 gms of sodium hydroxide were utilized to provide an alkaline pH of approximately 8.0. After the microcapsules were prepared and after the pH of the slurry had become stable, each sample was divided into three portions. One of these portions was heated to 45° C and maintained at that temperature for 2 hours utilizing an oil bath. A second portion was heated to 65° C and maintained at that temperature for approximately 2 hours utilizing an oil bath. The third portion was maintained at room temperature for use as a control. The microcapsules were then utilized for preparing CB paper in accordance with the procedure outlined in Example 1 above.

Each paper sheet was manifolded with its CB coating disposed in contacting relationship with respect to the clay coating on a sheet of CF paper. Images were developed by striking an impression on the papers with an electric typewriter and the intensity of the image was measured 20 minutes after the initial color development using a light reflectance procedure where the reflectance of the image is compared to the reflectance of the unimaged area utilizing a photovolt reflection meter. The samples were also each tested for accelerated blush and ghosting and were subjected to a drop test and liquid chromatography analyses.

CF discoloration has been variously described as blush, offset, etc. In the present disclosure, the term blush refers to a coloration on a CF coated sheet caused by contact with free color precursor present in a CB coating as a result of a small amount of precursor initially escaping encapsulation, of leaky capsules or of capsules which have been ruptured during processing or handling. The term "Accelerated Blush" refers to a test whereby capsules are intentionally broken under controlled pressure to free the dye precursor. The coated side of a CB sheet is placed against a conventional piece of paper and is passed through a manually operated test device that applies gradual increasing and decreasing pressures thereon. The CB sheet is then placed against a CF paper and the pair are placed in an oven at 50° C for various periods of time under a weight of 2 psi. The CF discoloration is measured using a photovolt reflection meter. "Ghosting" refers to secondary image transfer from a CB coating to a clay coated sheet. A primary image is the one produced on an original CF sheet by typing, printing, etc. To measure the secondary image transfer, a fresh CF sheet is mated with the CB in place of the original imaged CF and a weight of 2 psi is applied to the mated pair. The secondary image which results is examined visually at different periods. Ghosting can occur during ordinary handling of carbonless paper and is manifestly objectionable in carbonless copying systems.

In the drop test, the few drops of a capsule slurry are placed, utilizing a medicine dropper, approximately 1 inch from the top edge of a piece of CF paper held vertically. These drops are allowed to flow over the CF side of the paper and the paper is then air dried. The discoloration on the CF is due to the reaction between any free unencapsulated precursor present in the slurry and the CF coating itself. Free unencapsulated precursor is present because (1) a small amount of precursor initially escaped encapsulation during formulation; (2) some of the capsules have been broken during processing and handling; and/or (3) the dye precursor has been permitted to escape through the capsule shell itself.

Liquid chromatography analysis is utilized for determining precursor impurities in CB coatings. In accordance with the present Examples, the liquid chromatography analyses are given as percent p-toluene sulfinate of Michler's hydrol (PTSMH) and percent Michler's hydrol (MH). These percentages are proportional measures and not actual quantitative measures and are significant because Michler's hydrol is a hydrolysis or decomposition product of PTSMH. In this connection, there is substantial evidence that the presence of Michler's hydrol results in increased blush, ghosting and discoloration and further that Michler's hydrol is less stable than PTSMH. Thus, it is desirable to maximize the relative amount of PTSMH present while correspondingly minimizing the relative amount of MH. The liquid chromatography analyses procedure involves the extraction of all materials from the capsules with an extraction solvent. The solvent dissolves not only the materials in the capsules themselves but also any of free or unencapsulated compounds present. The extraction solvent is then analyzed using a liquid chromatograph.

The results of testing for Image Intensity and Accelerated Blush and the results of the Liquid Chromatography analyses are set forth in Table 1.

under various conditions of pH and heating. As can be seen from Table 1, blush is substantially reduced whenever the resin is used as compared to the same formulation without the resin. It is also important to note that this reduction in blush was accomplished without substantially effecting the image intensity. It can also be determined from the data of Table 1 that formulations which include the resin contain relatively less MH and relatively more PTSMH than do the identical formulations without the resin. This is significant, as explained above.

It was also determined from the foregoing testing that ghosting was significantly reduced by the inclusion of the resin in the capsule fill material. This was more apparent in the higher pH values formulations. From the drop test it was determined that CF discoloration was less with any formulation which included the resin than from the corresponding formulation without the resin. This is clear evidence of the effect of the resin in reducing the amount of free precursor in the wet formulation or at least of the effect of the resin in reducing the ability of the precursor to discolor CF coatings.

EXAMPLE 7

In this example, 1.8 grams of Epon 1002 were admixed with 20 grams of xylene and this admixture was warmed slightly on a hot plate until a clear solution was obtained. This solution was allowed to cool to room temperature and then 1.0 grams of the morpholine derivative of Michler's hydrol having the following molecular structural configuration.

TABLE I

| | pH VALUE | | IMAGE INTENSITY | | ACCELERATED BLUSH | | LIQUID CHROMATOGRAPHY ANALYSES % PTSMH | | LIQUID CHROMATOGRAPHY ANALYSES % MH | |
|---|---|---|---|---|---|---|---|---|---|---|
| FORMULATION: | Without Resin | With Resin | Without Resin | With Resin | Without Resin | With Resin | Without Resin | With Resin | Without Resin | With Resin |
| $Na_2CO_3$/Basic | | | | | | | | | | |
| Control | 8.1 | 7.8 | 58.9 | 54.2 | 84.0 | 95.0 | 77.6 | 93.08 | 22.3 | 6.9 |
| 45° C | 8.2 | 7.8 | 60.1 | 55.1 | 86.0 | 95.0 | 78.8 | 88.8 | 21.2 | 11.13 |
| 65° C | 8.4 | 8.1 | 60.9 | 57.3 | 86.0 | 94.5 | 55.7 | 73.68 | 44.2 | 23.31 |
| $Na_2CO_3$/Neutral | | | | | | | | | | |
| Control | 6.7 | 6.8 | 52.0 | 53.3 | 82.0 | 93.0 | 96.9 | 100.0 | Instrument | |
| 45° C | 6.7 | 6.8 | 51.1 | 52.1 | 81.0 | 93.6 | 100.0 | 100.0 | didn't integrate | |
| 65° C | 6.7 | 6.7 | 51.1 | 52.5 | 80.0 | 93.2 | 100.0 | 97.7 | properly | |
| $Na_2CO_3$/Acidic | | | | | | | | | | |
| Control | 5.9 | 6.0 | 49.5 | 52.3 | 75.0 | 92.8 | 97.6 | 98.7 | 2.36 | 1.26 |
| 45° C | 5.9 | 6.1 | 43.0 | 45.7 | 77.0 | 92.5 | 96.6 | 98.3 | 3.4 | 1.62 |
| 65° C | 5.8 | 6.0 | 51.7 | 51.5 | 78.0 | 93.0 | 96.2 | 98.5 | 3.78 | 1.47 |
| NaOH/Basic | | | | | | | | | | |
| Control | 8.2 | 7.9 | 54.0 | 53.7 | 90.2 | 94.5 | 71.16 | 90.3 | 28.8 | 9.6 |
| 45° C | 8.2 | 7.9 | 53.4 | 54.2 | 90.0 | 94.5 | 71.82 | 92.98 | 28.1 | 7.02 |
| 65° C | 8.2 | 7.9 | 54.2 | 52.9 | 90.0 | 95.0 | 69.18 | 84.9 | 30.8 | 15.1 |
| NaOH/Neutral | | | | | | | | | | |
| Control | 6.8 | 6.8 | 54.1 | 56.9 | 88.0 | 95.0 | 95.2 | 97.1 | 4.8 | 2.9 |
| 45° C | 6.8 | 6.8 | 51.8 | 58.1 | 87.0 | 94.5 | 93.9 | 96.1 | 6.0 | 3.85 |
| 65° C | 6.7 | 6.8 | 53.8 | 54.9 | 87.0 | 95.0 | 93.7 | 95.7 | 6.28 | 4.23 |
| NaOH/Acidic | | | | | | | | | | |
| Control | 6.05 | 6.0 | 50.4 | 56.9 | 86.5 | 95.0 | 96.9 | 98.5 | 3.05 | 1.48 |
| 45° C | 6.0 | 6.0 | 50.6 | 53.0 | 90.0 | 95.0 | 95.4 | 99.8 | 4.08 | 0.16 |
| 65° C | 5.85 | 5.85 | 56.4 | 54.5 | 89.0 | 94.8 | 95.1 | 100.0 | 4.23 | 0.00 |

The foregoing data illustrate the effect of the presence of the resin in the microcapsulated fill material

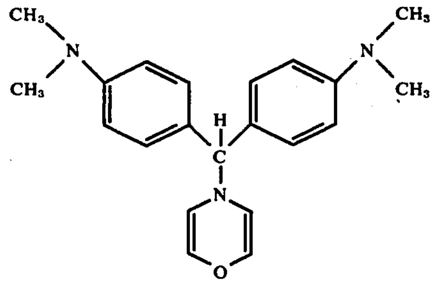

were added and the resultant mixture was again warmed slightly on a hot plate until a clear solution (solution A) was obtained. Thereafter, solution A was allowed to cool to room temperature. Then, 3.3 grams of terephthaloyl chloride were added to 10 grams of xylene and this mixture was also warmed slightly on a hot plate until a clear solution (solution B) was obtained. Solution B was then also allowed to cool to room temperature. After solutions A and B were prepared, 100ml of an aqueous solution containing 2.0 weight percent Elvanol 50-42 polyvinyl alcohol were placed in a semi-micro Waring blender and then solutions A and B were mixed together at room temperature and the resultant solution was added to the Elvanol solution in the blender. The blender was then activated and high shear agitation was continued for about 2 minutes until an emulsion having a dispersed phase particle size of about 5 to 6 microns was obtained. In this emulsion, the continuous phase was the aqueous solution containing the Elvanol polyvinyl alcohol and the dispersed phase was the xylene solution of the morpholine derivative of Michler's hydrol and terephthaloyl chloride. The emulsion was then transferred to a suitable container, such as a beaker, and was stirred with a variable speed mechanical stirrer at 300 to 500 rpm while an aqueous solution containing 3.0 gms of diethylene triamine and 20 ml of water was added. Stirring was continued at room temperature for about 24 hours until a stable pH of about 8.5 was observed. By this time, the particles of dispersed phase had become individually encapsulated in a polyamide shell. The capsules thus produced include a fill material containing Epon 1002 and the morpholine derivative of Michler's hydrol in a xylene carrier.

EXAMPLE 8

In this Example, the procedure outlined in Example 7 was repeated identically except that in this instance 1.8 grams of Styron 666U were utilized in solution A rather than the Epon 1002.

Examples 7 and 8 illustrate that different solvents can be utilized as the carrier material with the only requirement being that the particular precursor and the resin be soluble in the solvent.

EXAMPLE 9

The procedures outlined in Example 6 were repeated utilizing various Michler's hydrol derivatives as the color precursor. In this Example, the precursors utilized were Michler's hydrol, methyl ether of Michler's hydrol, benzyl ether of Michler's hydrol and the morpholine derivative of Michler's hydrol. These precursors were encapsulated with and without the resin, using the same formulations and procedures set forth above in connection with Example 6 except that in this instance only sodium carbonate was used to regulate the pH values and the formulations were mixed for 4 and 24 hours after which paper was coated in accordance with the procedure outlined in Example 1. This Example illustrates the effect of the presence of the resin on different precursors under various conditions of mixing and pH values. The drop test was performed on all of the wet formulations. The accelerated blush test, ghosting test, image intensity test and liquid chromatography analysis was also performed on the CB coatings. In conjunction with the accelerated blush test, CF discoloration from an area where capsules were not broken adjacent to the area of broken capsules on which the accelerated blush measurements are usually taken was also measured. The results of the foregoing testing are set forth in Table 2 hereinbelow.

TABLE 2

| | | | | | | ACCELERATED BLUSH TEST (5 days) | | | |
|---|---|---|---|---|---|---|---|---|---|
| | | pH VALUE | | IMAGE INTENSITY | | Broken Capsules | | Unbroken Capsules | |
| FORMULATION: | MIXING TIME Hours | Without Resin | With Resin | Without Resin | With Resin | Without Resin | With Resin | Without Resin | With Resin |
| 1. Acid formulation | 4 | 6.8 | 6.9 | 52.0 | 53.5 | 91.0 | 94.0 | 96.0 | 97.5 |
| PTSMH | 24 | 6.0 | 6.0 | 50.0 | 53.0 | 86.0 | 95.0 | 94.0 | 98.0 |
| 2. Basic formulation | 4 | 7.2 | 7.3 | 58.0 | 59.0 | 91.0 | 96.0 | 96.0 | 97.5 |
| PTSMH | 24 | 8.3 | 8.2 | 58.0 | 59.0 | 91.0 | 95.0 | 95.5 | 97.0 |
| 3. Acid formulation | 4 | 6.8 | 6.9 | 50.0 | 56.0 | 56.0 | 88.0 | 60.0 | 95.0 |
| MH | 24 | 6.0 | 6.0 | 48.0 | 56.0 | 45.0 | 86.0 | 46.0 | 92.0 |
| 4. Basic formulation | 4 | 7.3 | 7.4 | 50.0 | 53.0 | 63.5 | 90.5 | 69.0 | 96.0 |
| MH | 24 | 8.3 | 8.3 | 49.0 | 53.0 | 60.0 | 82.0 | 65.0 | 94.0 |
| 5. Acid formulation | 4 | 6.9 | 7.0 | 58.0 | 60.0 | 85.0 | 94.0 | 93.0 | 98.0 |
| Benzyl Ether of MH | 24 | 6.5 | 5.9 | 57.0 | 59.0 | 77.5 | 91.5 | 89.0 | 96.0 |
| 6. Basic formulation | 4 | 7.4 | 7.5 | 57.0 | 60.0 | 84.0 | 93.0 | 91.0 | 97.0 |
| Benzyl Ether of MH | 24 | 8.4 | 8.3 | 52.0 | 59.0 | 78.5 | 90.0 | 87.0 | 95.0 |
| 7. Acid formulation | 4 | 7.1 | 7.3 | 44.5 | 47.5 | 83.0 | 86.0 | 88.0 | 95.0 |
| Methyl Ether of MH | 24 | 6.2 | 6.4 | 44.0 | 44.0 | 65.0 | 78.0 | 80.0 | 94.0 |
| 8. Basic formulation | 4 | 7.5 | 7.5 | 40.0 | 43.5 | 72.0 | 77.0 | 82.0 | 92.0 |
| Methyl Ether of MH | 24 | 8.4 | 8.3 | 40.0 | 42.5 | 66.0 | 76.0 | 84.0 | 94.0 |
| 9. Acid formulation | 4 | 7.0 | 7.3 | 50.0 | 60.0 | 51.0 | 86.0 | 52.0 | 89.0 |
| Morpholine der. of MH | 24 | 6.8 | 7.0 | 43.0 | 60.0 | 42.0 | 85.0 | 48.0 | 91.0 |
| 10. Basic formulation | 4 | 7.4 | 7.3 | 53.0 | 59.0 | 43.0 | 83.5 | 44.0 | 88.0 |
| Morpholine der. of MH | 24 | 8.2 | 8.5 | 48.0 | 48.0 | 47.5 | 77.0 | 49.0 | 87.0 |

From the foregoing it can be seen that the amount of blush was substantially reduced whenever the resin was incorporated in the fill material. Moreover, the drop test showed significantly less CF discoloration in each case where the resin was utilized. In addition, the use of the resin resulted in less ghosting. Significantly, this reduction in blush and in ghosting was accomplished without a significant decrease in image intensity.

While the exact mechanism which enables resins like polystyrene resins and epoxy resins to reduce blush and ghosting without reducing image intensity is not known with any degree of certainty, a number of possible explanations have been formulated. These possibilities are outlined hereinafter and it is pointed out that any one of these or any combination thereof might be involved. In the first place, the affinity of the resin to the dye material might reduce the solubility of the latter sufficiently to prevent escape of the same to the water phase during the production of the microcapsules. This will substantially reduce the presence of free precursor material after the microcapsules have been formed. This same affinity could substantially reduce the mobility of the dye precursor and therefore the ability of the same to move to an adjacent CF coating in a manifolded set. Secondly, it is possible that the resin operates to reduce the rate of decomposition of the dye precursor to less stable and more sensitive decomposition products. In this connection it is noted that PTSMH decomposes to form Michler's hydrol which discolors, ghosts and blushes much more readily than does PTSMH itself. The resin could operate to prevent such decomposition. Thirdly, the resin could operate to reduce the mobility of the solvent or of the precursors to thereby reduce the chances of the same coming into contact with the CF. This could be the result of a reduction in the vapor pressure of the solvent or of the dye precursor. Moreover, the resin should operate to increase the viscosity of the liquid fill material. Fourthly, the resin could react or polymerize with the existing capsule wall to thereby toughen the capsule walls by cross-linking, to add a second wall inside the original wall or to plug holes which were originally present in the capsule walls. Moreover, it could be that upon breakage of the capsules, the resin will cure to form a film about the solvent or the precursor to reduce the mobility of the latter and prevent contact between the same and an adjacent CF coating.

In addition to the foregoing, some precursors, such as PTSMH, are susceptible to decomposition when contacted with water, some polar solvents and/or a high pH medium. The presence of the resin additive in the fill material, in accordance with the concepts and principles of the present invention, could operate to reduce the likelihood of such contact either by increasing the hydrophobicity of the capsule shell or by reducing the affinity of the various fill materials for water, for such polar solvents and/or for high pH media.

I claim:

1. In a process for preparing improved microcapsules which are useful in connection with carbonless copying systems and which comprise minute discrete droplets of liquid fill material including an initially colorless chemically reactive color forming dye precursor and a carrier therefor encapsulated within individual rupturable, generally continuous polyamide shells formed thereabout, the improvement of said process comprising:

incorporating in said fill material, an amount of a resin effective to render said microcapsules resistant to inadvertent release and transfer of said fill material, said resin being selected from the group consisting of polystyrene resins and epoxy resins.

2. A process as set forth in claim 1 wherein said resin is an epoxy resin.

3. A process as set forth in claim 2 wherein said resin is an epichlorohydrin/bisphenol A epoxy resin.

4. A process as set forth in claim 2 wherein said polyamide shells are formed by interfacial polycondensation.

5. A process as set forth in claim 4 wherein said shells are formed from a polyterephthalamide and said epoxy resin is an epichlorohydrin/bisphenol A epoxy resin.

6. A process as set forth in claim 5 wherein said polyterephthalamide is the reaction product of terephthaloyl chloride and diethylene triamine.

7. A process as set forth in claim 1 wherein said dye precursor is selected from the group consisting of Michler's hydrol, p-toluene sulfinate of Michler's hydrol, methyl ether of Michler's hydrol, benzyl ether of Michler's hydrol and a morpholine derivative of Michler's hydrol having the formula:

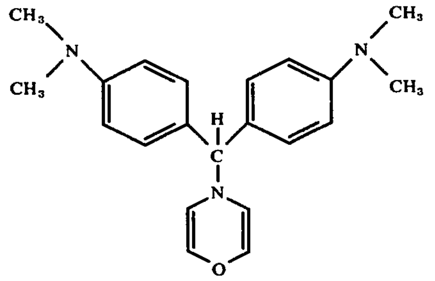

8. A process as set forth in claim 7 wherein said precursor is p-toluene sulfinate of Michler's hydrol, wherein said shells are formed from a polyterephthalamide and wherein said resin is an epichlorohydrin/bisphenol A epoxy resin.

9. A process as set forth in claim 1 wherein said carrier is dibutyl phthalate and said resin is an epichlorohydrin/bisphenol A epoxy resin.

10. A process as set forth in claim 6 wherein said precursor is p-toluene sulfinate of Michler's hydrol and said carrier is dibutyl phthalate.

11. A process as set forth in claim 1 wherein the quantity of said resin incorporated in said fill is within the range of from about 1.3 to about 13.3 weight percent based on the weight of said carrier.

12. A process as set forth in claim 11 wherein the quantity of said resin incorporated in said fill is about 6.7 weight percent based on the weight of the carrier.

13. A process as set forth in claim 3 wherein the epoxide equivalent of said resin is within the range of from about 350 to about 2500.

14. A process as set forth in claim 8 wherein the epoxide equivalent of said resin is within the range of from about 600 to about 700.

15. A process as set forth in claim 14 wherein the quantity of said resin incorporated in said fill is within the range of from about 1.3 to 13.3 weight percent based on the weight of said carrier.

16. A process as set forth in claim 15 wherein the quantity of said resin incorporated in said fill is about 6.7 weight percent based on the weight of the carrier.

17. Microcapsules which are useful in connection with carbonless copying systems comprising:

minute, discrete droplets of liquid fill material including an initially colorless chemically reactive color forming dye precursor and a carrier therefor;

individual, rupturable, generally continuous polyamide shells encapsulating said droplets; and an amount of a resin effective to render said microcapsules resistant to inadvertent release and transfer of said fill material incorporated in said fill material, said resin being selected from the group consisting of polystyrene resins and epoxy resins.

18. Microcapsules as set forth in claim 17 wherein said resin is an epoxy resin.

19. Microcapsules as set forth in claim 18 wherein said resin is an epichlorohydrin/bisphenol A epoxy resin.

20. Microcapsules as set forth in claim 18 wherein said polyamide shells are formed by interfacial polycondensation.

21. Microcapsules as set forth in claim 20 wherein said shells are formed from a polyterephthalamide and said epoxy resin is an epichlorohydrin/bisphenol A epoxy resin.

22. Microcapsules as set forth in claim 21 wherein said polyterephthalamide is the reaction product of terephthaloyl chloride and diethylene triamine.

23. Microcapsules as set forth in claim 17 wherein said dye precursor is selected from the group consisting of Michler's hydrol, p-toluene sulfinate of Michler's hydrol, methyl ether of Michler's hydrol, benzyl ether of Michler's hydrol and a morpholine derivative of Michler's hydrol having the formula:

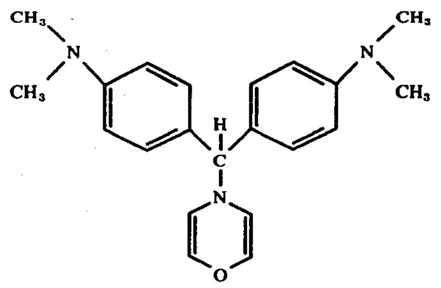

24. Microcapsules as set forth in claim 23 wherein said precursor is p-toluene sulfinate of Michler's hydrol, wherein said shells are formed from a polyterephthalamide and wherein said resin is an epichlorohydrin/bisphenol A epoxy resin.

25. Microcapsules as set forth in claim 17 wherein said carrier is dibutyl phthalate and said resin is an epichlorohydrin/bisphenol A epoxy resin.

26. Microcapsules as set forth in claim 22 wherein said precursor is p-toluene sulfinate of Michler's hydrol and said carrier is dibutyl phthalate.

27. Microcapsules as set forth in claim 17 wherein the quantity of said resin present in said fill is within the range of from about 1.3 to about 13.3 weight percent based on the weight of said carrier.

28. Microcapsules as set forth in claim 27 wherein the quantity of said resin present in the fill is about 6.7 weight percent based on the weight of said carrier.

29. Microcapsules as set forth in claim 19 wherein the epoxide equivalent of said resin is within the range of from about 350 to about 2500.

30. Microcapsules as set forth in claim 24 wherein the epoxide equivalent of said resin is within the range of from about 600 to about 700.

31. Microcapsules as set forth in claim 29 wherein the quantity of said resin present in said fill is within the range of from about 1.3 to about 13.3 weight percent based on the weight of said carrier.

32. Microcapsules as set forth in claim 30 wherein the quantity of said resin present in the fill is about 6.7 weight percent based on the weight of said carrier.

* * * * *